United States Patent
Bailey

(10) Patent No.: US 11,123,664 B2
(45) Date of Patent: Sep. 21, 2021

(54) SCREENING APPARATUS

(71) Applicant: Axiom Process Limited, Newcastle Upon Tyne (GB)

(72) Inventor: Marshall Graham Bailey, Dubai (AE)

(73) Assignee: National Oilwell Varco UK Limited, Stonehouse (GB)

( * ) Notice: Subject to any disclaimer, the term of this patent is extended or adjusted under 35 U.S.C. 154(b) by 270 days.

(21) Appl. No.: 16/341,324

(22) PCT Filed: Oct. 13, 2017

(86) PCT No.: PCT/GB2017/053111
§ 371 (c)(1),
(2) Date: Apr. 11, 2019

(87) PCT Pub. No.: WO2018/069729
PCT Pub. Date: Apr. 19, 2018

(65) Prior Publication Data
US 2020/0047091 A1   Feb. 13, 2020

(30) Foreign Application Priority Data
Oct. 14, 2016   (GB) ..................................... 1617435

(51) Int. Cl.
*B07B 1/46*   (2006.01)
*B01D 33/03*   (2006.01)
(Continued)

(52) U.S. Cl.
CPC ............ *B01D 33/0376* (2013.01); *B07B 1/46* (2013.01); *B07B 13/16* (2013.01); *B07B 2201/04* (2013.01);
(Continued)

(58) Field of Classification Search
CPC ....... B07B 1/46; B07B 13/16; B07B 2201/04; B07B 2230/01; B01D 33/0376; E21B 21/065
See application file for complete search history.

(56) References Cited

U.S. PATENT DOCUMENTS 4,322,288 A * 3/1982 Schmidt .................... B02B 1/02
209/240
4,446,022 A * 5/1984 Harry ..................... B01D 35/28
210/388

(Continued)

FOREIGN PATENT DOCUMENTS

WO      2015166282      11/2015

OTHER PUBLICATIONS

Written Opinion for PCT/GB2017/053111 dated Feb. 26, 2018 (11 pages).

(Continued)

*Primary Examiner* — Joseph C Rodriguez
(74) *Attorney, Agent, or Firm* — Conley Rose, P.C.

(57) ABSTRACT

A shale shaker includes a basket having a front, solids discharge end and a rear, feed end spaced apart by opposed first and second sides. The basket includes a lower, first, screen deck and an upper, second, screen deck directly above the first screen deck. The screening surfaces of the screen decks are spaced apart, by a vertical spacing of from 20 mm to 250 mm. There is a cavity above the feed receiving end of the first screen deck, in direct fluid communication with the space between the screening surfaces of the first and second screen decks ( ) that only receives feed that has passed through the upper, second, screen deck. The cavity extends to higher than the extreme end of the screening surface of the second screen deck, at its feed receiving end.

20 Claims, 7 Drawing Sheets

(51) Int. Cl.
*B07B 13/16* (2006.01)
*E21B 21/06* (2006.01)

(52) U.S. Cl.
CPC ......... *B07B 2230/01* (2013.01); *E21B 21/065* (2013.01)

(56) References Cited

U.S. PATENT DOCUMENTS

| | | | | |
|---|---|---|---|---|
| 4,634,535 A * | 1/1987 | Lott | ................... | B01D 21/00 |
| | | | | 210/780 |
| 4,818,379 A * | 4/1989 | Eggerstedt | ................ | B07B 1/46 |
| | | | | 209/254 |
| 6,530,482 B1 * | 3/2003 | Wiseman | ........... | B01D 33/0346 |
| | | | | 209/253 |
| 6,820,748 B2 * | 11/2004 | Fallon | ..................... | B07B 1/46 |
| | | | | 209/311 |
| 6,868,972 B2 * | 3/2005 | Seyffert | ............. | B01D 33/0376 |
| | | | | 209/254 |
| 7,111,739 B2 * | 9/2006 | Tsutsumi | ................. | B07B 1/40 |
| | | | | 209/254 |
| 7,703,612 B2 * | 4/2010 | Browne | ................... | B07B 1/46 |
| | | | | 209/311 |
| 8,453,844 B2 * | 6/2013 | Bailey | ................... | E21B 21/065 |
| | | | | 209/317 |
| 9,199,278 B2 * | 12/2015 | Scott | ...................... | B01D 33/37 |
| 9,677,353 B2 * | 6/2017 | Burnett | ..................... | B07B 1/28 |
| 9,957,762 B2 * | 5/2018 | Marshall | ................. | E21B 21/01 |
| 2006/0144779 A1 * | 7/2006 | Bailey | ................... | B01D 33/39 |
| | | | | 210/330 |
| 2008/0251428 A1 | 10/2008 | Bailey | | |
| 2010/0089652 A1 | 4/2010 | Burnett | | |
| 2011/0297373 A1 * | 12/2011 | Timmerman | ......... | E21B 21/063 |
| | | | | 166/267 |
| 2020/0047091 A1 * | 2/2020 | Bailey | ............... | B01D 33/0376 |

OTHER PUBLICATIONS

International Search Report for PCT/GB2017/053111 dated Feb. 26, 2018 (7 pages).
International Preliminary Report on Patentability for PCT/GB2017/053111 dated Oct. 1, 2018 (19 pages).

* cited by examiner

SCREENING APPARATUS

CROSS REFERENCE TO RELATED APPLICATIONS

This application is a 35 U.S.C. § 371 national stage application of PCT/GB2017/053111 filed Oct. 13, 2017 and entitled "Screening Apparatus", which claims priority to United Kingdom Patent Application No. 1617435.1 filed Oct. 14, 2016, each of which is incorporated herein by reference in their entirety for all purposes.

STATEMENT REGARDING FEDERALLY SPONSORED RESEARCH OR DEVELOPMENT

Not Applicable

FIELD OF THE INVENTION

This disclosure relates to screening arrangements used in shale shakers as used for example for separating drill cuttings from used drilling mud when drilling operations such as drilling an oil well are being carried out.

BACKGROUND

Screening machines, especially vibratory screening machines such as the so called 'shale shakers' of the oil well drilling industry are used with success in methods of solids/liquids separation, especially classification.

An earlier patent application by the present applicant (WO2015/166282) describes a shale shaker that includes a basket mounting at least two, typically three, screen decks that are closely spaced together one above the other. Each deck has a screening surface for screening a solids and liquid feed (normally used drilling mud and drill cuttings). The described machine is used for a screening method with the feed receiving end of each screening surface in the stack of two or three screen decks submerged in a common pond of applied solids and liquid feed.

The entire contents of WO2015/166282 are incorporated by reference herein. The shale shaker and method described in that application provide notable improvements in compactness of design and improved throughput for a feed that is to be successively screened through at least the two or three screen decks in the stack provided in the basket. A number of optional features are described to facilitate screening operations and/or to allow operations under different conditions such as a change in feed character or the desire to collect solids from different screening surfaces separately to allow recycling of solids of preferred physical characteristics to a drilling mud.

Whilst shale shakers of different types are available there remains the desire to improve efficiency further.

SUMMARY OF THE DISCLOSURE

The present disclosure provides a shale shaker comprising:
a basket having a front, solids discharge end and a rear, feed end spaced apart by opposed first and second sides;
said basket including a stack of screen decks, each screen deck having a screening surface, with the screening surface of the screen decks spaced apart and superposed one above the other;
wherein the stack of screen decks comprises at least a lower, first, screen deck and an upper, second, screen deck, directly above the first screen deck, and wherein the screening surfaces of the first and second screen decks are spaced apart, by a vertical spacing of from 20 mm to 250 mm, at the extreme end of the feed receiving end of the second screen deck;
wherein the screening surfaces of each of the first and second screen decks have a lower, feed receiving, end that is proximal to a fluid retaining wall at the rear end of the basket and a distal, higher, solids discharge end at the front of the basket;
wherein the feed receiving end of the second screen deck is further from the back of the basket than the feed receiving end of the first screen deck; and
wherein there is a cavity, above the feed receiving end of the first screen deck in direct fluid communication with the space between the screening surfaces of the first and second screen decks, and only receiving feed that has passed through the upper, second, screen deck; the cavity extending to higher than the extreme end of the screening surface of the second screen deck, at the feed receiving end.

The second screen deck is directly above the first screen deck i.e. there is no intervening screen deck.

The cavity may be directly above the screening surface at the feed receiving end of the first screen deck.

The vertical spacing between screening surfaces of the first and second screen decks is from 20 mm to 250 mm. It may be from 20 mm to 150 mm or even from 20 mm to 120 mm.

The cavity only receives feed that has passed through the upper, second, screen deck. An applied feed, typically a used drilling mud containing drill cuttings, is fed into the shale shaker basket to be processed through the stack of screen decks, each screen deck processes feed reaching it by removing solids of a size not passing through the apertures of the respective screening surface. All the feed in the cavity has passed through the second screen deck.

The basket mounting the stack of screen decks as described above may be used to separating solids from a drill cuttings and drilling mud mixture feed, the method comprising:
a) providing the shale shaker as described above;
b) providing a drill cuttings and drilling mud mixture feed to the rear feed end of the basket so as to form a pond of solids and liquid in a pond region defined by the fluid retaining wall and the feed receiving end of the screening surface of the lower first screen deck; the pond region immersing a portion of the screening surface at the feed receiving end of each of the at least two screen decks; and
c) operating the shale shaker with a feed rate so as to maintain the pond whilst screening the drill cuttings and drilling mud mixture feed on the screening surfaces.

Thus the shale shaker of the disclosure may be used to carry out the methods described in WO2015/166282, but in a shale shaker featuring a cavity above the feed receiving end of the first screen deck of a height that is greater than the spacing between the screening surfaces of the first and second screen decks, at their feed receiving ends.

This cavity extending to higher than the extreme end of the screening surface of the second screen deck, at the feed receiving end; has surprisingly been found beneficial in use. It might have been expected that the cavity would constitute a "dead space" above the respective screening surface, that would tend to accumulate solids when fed with a solids and liquids feed. In practice good screening efficiency can be obtained, with solids collected on the screening surface of the first screen deck moving efficiently towards the solids discharge end of the basket.

At the same time, a significant reduction in wear rate of the screening surface of the lower, first, screen deck has been observed in comparison to an arrangement where the cavity does not extend to a height above the spacing between screening surfaces of adjacent (directly one above the other) screen decks.

This reduction in wear is particularly important in a multi deck screening machine where the need to repair or replace the screening material of a screening surface requires halting of screening operations or diverting of the feed; whilst screening surfaces are removed, inspected, and repaired or replaced. Economic benefits may be obtained in terms of reduced down time and increased lifetime for screening surfaces.

Screening surfaces are typically of a wire mesh and mounted on an apertured plate, which in turn is mounted and tensioned across a support frame in the usual way to form a screen deck. The screen decks utilized may be in the form of crown decks as often employed in shale shakers i.e. they are arcuate, rising up towards the front to back center line screening surface. Support frames may be permanently fixed in the basket with screening surfaces slid onto them when being replaced. Alternatively the support frames may be demountable and removable from the basket when required.

The shale shaker may be further provided with a third screen deck, directly above the second screen deck that may have a similar relationship to the second screen deck as the second screen deck has to the first. This third screen deck may be an uppermost screen deck, but other screen decks may be provided above.

Additionally or alternatively other screen decks may be provided, above or below the first and second screen decks. Such other screen decks may or may not be provided in a relationship with a lower screen deck that provides a cavity as described for the first and second screen decks. Such other screen decks may or may not participate in a pond region, in use. For example, a coarse meshed scalping screen deck may be provided, that is above a pond region formed at the first and second screen decks in use of the shale shaker.

Thus the shale shaker may be further provided with a third screen deck, directly above the second screen deck;
  wherein the screening surfaces of the second and third screen decks are spaced apart, by a vertical spacing of from 20 mm to 250 mm, at the extreme end of the feed receiving end of the third screen deck;
  wherein the feed receiving end of the third screen deck is further from the back of the basket than the feed receiving end of the second screen deck;
  wherein the screening surface of the third screen deck has a lower, feed receiving, end that is proximal to the fluid retaining wall at the rear end of the basket and a distal, higher, solids discharge end at the front of the basket; and
  wherein there is a second cavity, above the feed receiving end of the second screen deck in direct fluid communication with the space between the screening surfaces of the second and third screen decks, and only receiving feed that has passed through the third screen deck; the second cavity extending to higher than the extreme end of the screening surface of the third screen deck, at the feed receiving end.

The second cavity may be directly above the screening surface at the feed receiving end of the second screen deck.

The vertical spacing between screening surfaces of the second and third screen decks is from 20 mm to 250 mm. It may be from 20 mm to 150 mm or even from 20 mm to 120 mm.

The second cavity only receives feed that has passed through the third screen deck. An applied feed, typically a used drilling mud containing drill cuttings, is fed into the shale shaker basket to be processed through the stack of screen decks, each screen deck processes feed reaching it by removing solids of a size not passing through the apertures of the respective screening surface. All the feed in the second cavity has passed through the third screen deck.

Where a third screen deck as described above is provided then the shale shaker may be employed in a screening method using a common pond that includes a pond region immersing a portion of the screening surface at the feed receiving end of each of the at least three screen decks.

The vertical height of the cavity or the second cavity may be of from 115% to 1000%, 115% to 500% or even from 115% to 300% of the vertical spacing between the respective screening surfaces. The vertical spacing between the respective screening surfaces is measured at the extreme end of the screening surface of the uppermost of the respective screen decks. The vertical height of the cavity or second cavity is the maximum vertical height: from the lowest point of the screening surface or other upper surface of the lower screen deck within the cavity, to the highest point in the cavity.

Where the cavity is provided with a roof, the highest point in the cavity is the highest point inside the roof. Where the cavity is not provided with a roof, the highest point of the cavity is the highest fluid retaining point of a fluid retaining wall that retains fluid within the cavity.

Where both the cavity and the second cavity are provided they may have the same or different dimensions. In particular the vertical height of the cavities may be the same or different.

The cavity may extend at least across the full width or substantially the full width of the screening surface of the first screen deck. The second cavity may extend at least across the full width or substantially the full width of the screening surface of the second screen deck.

The connection between the lower first screen deck and the fluid retaining wall may be to a flange of the wall or to the wall. For example a support frame or support frames of the first screen deck is fixed to the flange. The fixing may be releasable (e.g. by bolting) or permanent (e.g. by welding). The screening surface of the first screen deck may be in sealing, or in substantially sealing, contact with the flange or directly onto the wall.

The cavity is in direct fluid communication with the space between the screening surfaces of the first and second screen decks i.e. liquids and solids in the space between these screening surfaces may flow into the cavity. There may be no outlet for solids and liquid from the cavity other than to the screening surfaces of the first and second screen decks and the space between them.

Conveniently the cavity may be defined by the feed receiving end of the lower first screen deck, the fluid retaining wall, and a roof. The fluid retaining wall and the roof may prevent exit of liquid and solids from the cavity other than to the screening surfaces of the first and second screen decks and the space between them. The cavity may be further defined by the opposed first and second sides of the basket.

The cavity may be defined by the feed receiving end of the lower first screen deck, the fluid retaining wall, and a roof. The roof of the cavity may be a downwards directed flange of the fluid retaining wall, projecting toward the front end of the basket, that the feed receiving end of the second screen deck connects to. For example a support frame or support frames of the second screen deck is fixed to the flange. The fixing may be releasable (e.g. by bolting) or permanent (e.g. by welding). The screening surface of the second screen deck may be in sealing, or in substantially sealing, contact with the flange.

Alternative arrangements can be made that include the cavity extending to higher than the extreme end of the screening surface of the second screen deck, at the feed receiving end. For example the lower first screen deck connects to the fluid retaining wall (optionally via a flange of the wall) and the upper second screen deck connects to a second fluid retaining wall (optionally via a flange of the second wall) that is closer to the front end of the basket (the solids discharge end). In such an arrangement the cavity may be defined by the feed receiving end of the lower first screen deck, the fluid retaining wall, and the second fluid retaining wall. Such a cavity may have a roof. The cavity may be further defined by the opposed first and second sides of the basket.

The fluid retaining wall and the second fluid retaining wall may be formed and arranged so that, in use, there is no other outlet for solids and liquid from the cavity other than to the screening surfaces of the first and second screen decks and the space between them. There may be a roof that prevents exit of liquid and solids and/or fluid retaining walls may be of sufficient height to retain liquid and solids in the cavity between the fluid retaining walls (in normal use) until it is processed by the screening surface of the first screen deck.

Where a third screen deck is fitted then the second cavity may be defined by the feed receiving end of the second screen deck, the fluid retaining wall; and a second downwards directed flange of the fluid retaining wall projecting towards the front end of the basket that the feed receiving end of the third screen deck connects to. Arrangements may be as discussed above with respect to the second deck. The second cavity may be further defined by the opposed first and second sides of the basket.

Alternatively the third screen deck may connect to a forwards projecting downwards directed flange of a second fluid retaining wall or even to a third fluid retaining wall (optionally via a flange of the third wall) that is closer to the front of the basket than the second fluid retaining wall.

In an arrangement where the third screen deck connect to a forwards projecting downwards directed flange of a second fluid retaining wall the second cavity may be defined by the feed receiving end of the second screen deck, the second fluid retaining wall to which it connects, and a roof that is the downwards directed flange of the second fluid retaining wall. The second cavity may be further defined by the opposed first and second sides of the basket.

In an arrangement with a third fluid retaining wall, the second cavity may be defined by the feed receiving end of the second screen deck, the fluid retaining wall to which it connects, and the third fluid retaining wall. The second cavity may be further defined by the opposed first and second sides of the basket.

The second cavity may have no outlet for solids and liquid from the cavity other than to the screening surfaces of the second and third screen decks and the space between them. It will be understood that where the cavity does not have a roof the fluid retaining wall or walls is of sufficient height to retain liquid and solids from exiting the top of the first cavity in normal use.

Arrangements such as those discussed above for the cavity are also contemplated for the second cavity. The second cavity may include a roof. The roof and/or fluid retaining wall or walls may prevent exit of solids and liquid from the cavity other than to the screening surfaces of the second and third screen decks and the space between them. The fluid retaining walls of the first cavity may be of sufficient height to retain liquid and solids in the first cavity between the fluid retaining walls until it is processed by the screening surface of the second screen deck.

The feed receiving end of the second screen deck is further from the back of the basket than the feed receiving end of the first screen deck. If provided, the feed receiving end of the third screen deck is further from the back of the basket than the feed receiving end of the second screen deck.

This arrangement is advantageous where similar or the same screen deck lengths are used for the first, second and (if used) third screen decks. The horizontal stagger in the positioning of the screen decks at the feed end of the basket means that the solids discharge ends of the screen decks are also horizontally staggered with the solids discharge end of the third screen deck overhanging the solids discharge end of the second screen deck. The solids discharge end of the second screen deck overhangs the solids discharge end of first screen deck. Thus solids discharged in the use of the shale shaker can fall directly without interfering with each other. Simplified solids collection, without requiring chutes connected to ends of screen decks can be employed. In particular, a solids collecting and distribution chute, that may be mounted on the basket can be used for separate collection of solids discharged from at least the first and second screen decks. When mounted on the basket, such a chute is vibrated by the vibratory action of the basket, helping to avoid blockages and can be compact in form. The chute may be adjustable to allow redirection of solids e.g. to send all the solids collected from the first second and (if provided) third screens in the in the same direction or to send them in different directions.

Although the use of similar or the same screen deck lengths as discussed above may be advantageous, alternative arrangements are contemplated. By using different screen deck lengths, the horizontal stagger in the positioning of the screen decks at the feed end of the basket may not provide the same stagger at the solids discharge end. For example if desired different screen deck lengths may be provided that allow the solids discharge ends of the screen decks to be one substantially vertically above the other; or even one vertically above the other. This can be arranged with two screen decks, three screen decks or more. Such arrangements may be used where all the solids collected on the screen decks are to be collected together. However, in such an arrangement, separate collection of solids discharged from a screen deck may be desired in some circumstances. If so, fitting a short extension to the solids discharge end of a screen deck can be used to provide a horizontal stagger, facilitating separate collection of the desired solids fraction.

Advantageously the feed receiving end of the second screen deck is further from the back of the basket than the feed receiving end of the first screen deck by a horizontal displacement of from 25 mm to 500 mm or even of from 50 mm to 150 mm. Similarly where a third screen deck is provided the feed receiving end of the third screen deck is further from the back of the basket than the feed receiving end of the second screen deck by a horizontal displacement of from 25 mm to 500 mm or even of from 50 mm to 150 mm.

The vertical spacing between screening surfaces of screen decks is from 20 mm to 250 mm or from 20 mm to 150 mm or even from 20 mm to 120 mm, at their feed receiving ends. The screen decks may be spaced apart and parallel and so have a substantially constant spacing along their length. Conveniently the spacing between the screening surfaces of the first and second screen decks and between the screening surfaces of the second and third screen decks is the same.

Alternatively the spacing between screening surfaces may diverge, or may converge; from the rear of the basket towards the front of the basket. A wider spacing at the feed receiving ends and a narrower spacing at the solids discharge ends (a converging arrangement) can allow a deeper space between screening surfaces in the pond region. This may be advantageous if large volumes of fluid are to be processed.

According to a further aspect, the present disclosure provides a shale shaker basket having a front, solids discharge end and a rear, feed end spaced apart by opposed first and second sides; and comprising the stack of screen decks as described above with respect to the shale shaker described therein.

According to another aspect, the present disclosure provides a solids collecting and distribution chute for a shale shaker, the chute comprising:
first and second elongate troughs in a side by side relationship, the troughs extending across the width of the basket of a shale shaker, in use and divided by a wall; wherein at least one solids discharge port of the first elongate trough is formed to direct solids in a direction transverse to its length and at least one solids discharge port of the second elongate trough is formed to direct solids in a direction transverse to its length.

At least one of the troughs may be provided with at least one ramp for directing solids falling into the trough towards at least one solids discharge port. Both of the troughs may be provided with at least one ramp for directing solids falling into the trough towards at least one solids discharge port.

The solids discharge ports may include at least one solids discharge ramp for directing the solids being discharged.

The solids collecting and distribution chute may be mounted on a shale shaker in use, to obtain benefit of the vibratory action.

Advantageously the at least one solids discharge port of the second elongate trough is formed to direct solids in a direction transverse to its length that is in a direction away from the solids discharge direction of the first elongate trough.

Advantageously the solids discharge port or ports of the first elongate trough directs solids substantially at right angles to the length of the troughs and the solids discharge port or ports of the second elongate trough directs solids substantially at right angles to the length of the troughs in the opposite direction.

Advantageously the solids discharge port or ports of the first elongate trough direct solids transversely and beneath the second elongate trough. The port or ports can extend underneath at least the whole width of the second elongate trough i.e. be a conduit or pipe, that may include a downwards directed ramp, passing beneath the second elongate trough.

The chute affords a convenient means of recycling solids of a selected size range to the drilling mud. Solids collected from one of the elongate troughs may be added to drilling mud (either fresh or recycled) at any convenient point in the drilling mud system, for example directly to drilling mud that has been passed through the shale shaker. Alternatively, solids collected from one of the troughs may be added to drilling mud at a point in the drilling mud system after the mud that has passed through the shale shaker has been further processed.

The chute may be provided with a baffle piece to cover at least one of the first and second troughs to allow redirection of solids landing on the baffle piece. For example the baffle piece may cover one of the troughs and have a top surface that is sloped to direct solids in the same direction as solids exiting from the other trough.

DETAILED DESCRIPTION OF DISCLOSED EXEMPLARY EMBODIMENTS

Figure 1:
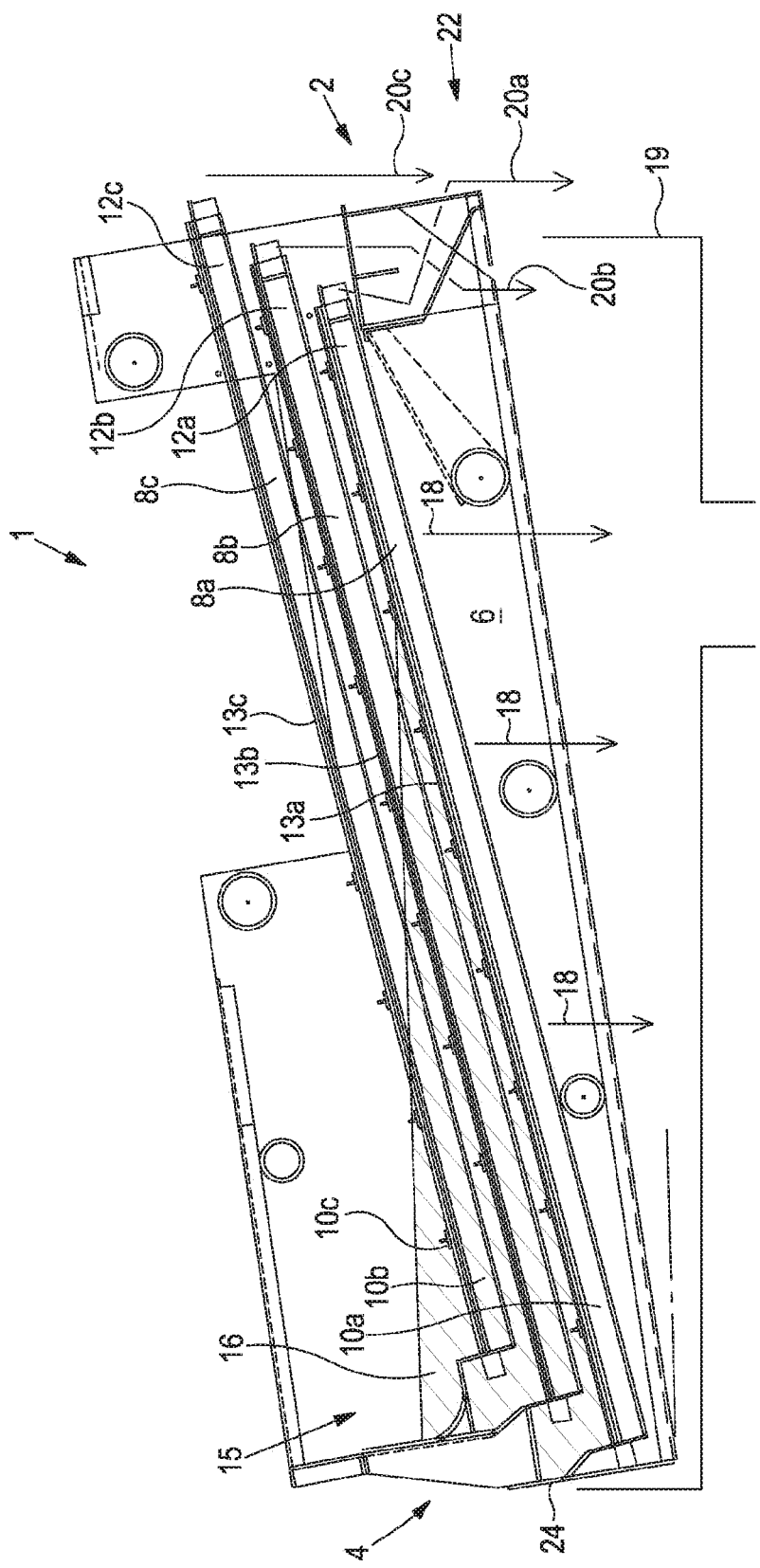
FIG. 1 shows a schematic elevation of a shale shaker basket fitted with three screen decks and made in accordance with principles disclosed herein.

A schematic side elevation of a shale shaker basket 1 is depicted in FIG. 1. The basket 1 has a front, solids discharge end 2 and a rear, feed end 4 separated by the basket sides of which one side 6 is visible in this view. The vibratory drive that imparts vibratory motion to basket 1 is not shown, for clarity.

The basket 1 mounts a stack of three screen decks 8a, 8b, 8c in this example, one above the other. Each screen deck has a lower feed receiving end 10a, 10b, 10c (shown in more detail in magnified detail FIG. 1a) and a higher solids discharge end 12a, 12b, and 12c. The screen decks have respective screening surfaces 13a, 13b, 13c mounted on support frames 14a, 14b, 14c. In this example the spacing of the screening surfaces 13a, 13b, 13c remains the same from front to back of the basket i.e. they are in a parallel relationship.

A used drilling mud 15 applied as feed to the feed receiving end 4 forms a common pond of feed 16 as the feed is processed by the three screen decks 8a, 8b, 8c. The screen decks 8a, 8b, 8c will be in sealing engagement or substantial sealing engagement with the sides of the basket 1 in the usual way. As indicated by arrows 18, liquid and solids passing through the screening surfaces 13a, 13b, 13c flows out of the bottom of the basket 1 via a collection system or sump suggested by line 19. Solids collected by the screening surfaces travel ("walk up") the screening surfaces to the solids discharge ends 12a, 12b, 12c by vibratory action applied to the basket. The solids fall off the staggered solids discharge ends 12a, 12b, 12c as indicated by arrows 20a, 20b and 20c for disposal or reuse as discussed further below with respect to FIG. 3; which shows more detail of the solids collecting and distribution chute 22.

The screening surfaces 13a, 13b, 13c are all of the same length, for example by making use of standard sized components for the screen decks. The stagger of the solids discharge ends 12a, 12b, 12c is obtained by the mounting arrangements at the rear end 4 of the basket as described below.

Figure 1A:
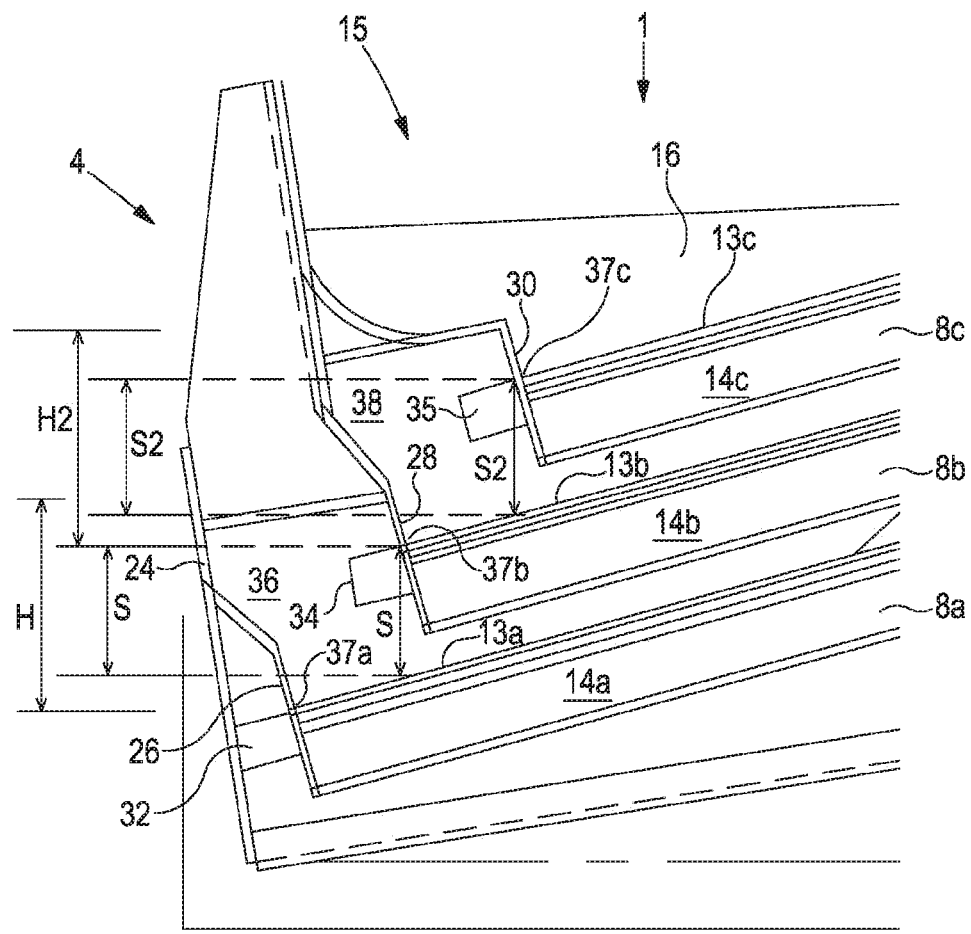
FIG. 1a shows in magnified detail the rear end of the shale shaker basket of FIG. 1.

As can be seen more clearly in magnified detail FIG. 1a, the feed end 4 of the basket 1 includes a fluid retaining wall 24 that has downwards directed flanges 26, 28 and 30, projecting towards the front end of the basket i.e. away from the rear end 4 of the basket.

Flange 26 mounts the feed receiving end 10a of the lower, first screen deck 8a. Fixing and sealing arrangements are suggested in this schematic by box 32. Fixing may include bolts passing through flange 26 securing the support frame 14a. Screening surface 13a is in sealing contact or substantially sealing contact at its extreme end 37a with flange 26. An alternative arrangement would be to mount the feed receiving end 10a directly to the fluid retaining wall 24. Above, flange 28 mounts the feed receiving end 10b of the second screen deck 8b by a similar fixing and sealing arrangement to that of screen deck 8a, as suggested by box 34. Screening surface 13b is in sealing contact or substantially sealing contact with flange 28. Cavity 36 is defined by screening surface 13a the fluid retaining wall (flange 26 of wall 24 in this example) and a roof formed by flange 28. Cavity 36 only receives feed that has passed though deck 8b. Solids and liquid within cavity 36 may only escape to the screening surfaces 13a, 13b and the space between them. Thus the first screening surface 13a will process all the feed 15 passing through the second screening surface 13b.

The vertical height H of cavity 36 exceeds the vertical spacing S between screening surfaces 13a and 13b at the feed receiving ends. The cavity 36 extends to higher than the extreme end 37b of the screening surface 13b of the second screen deck 8b, at the feed receiving end 10b. In this example, the cavity 36 is directly above the screening surface 13a at the feed receiving end 10a of the first screen deck 8a.

A second cavity 38 is defined by screening surface 13b, flange 28 of fluid retaining wall 24 and a roof formed by flange 30. Flange 30 mounts the feed receiving end 10c of the third screen deck 8c. A similar fixing and sealing arrangement to that of screen deck 8a, is employed, as suggested by box 35. The vertical height H2 of cavity 38 exceeds the vertical spacing S2 between screening surfaces 13b and 13c at the feed receiving ends. The cavity 38 extends to higher than the extreme end 37c of the screening surface 13c of the third screen deck 8c, at the feed receiving end 10c. In this example, the cavity 38 is directly above the screening surface 13b at the feed receiving end 10b of the second screen deck 8b. Cavity 38 only receives feed that has passed though deck 8c. Solids and liquid within cavity 38 may only escape to the screening surfaces 13b, 13c and the space between them. Thus the screening surface 13b will process all the feed 15 passing through the third screening surface 13c.

In use the arrangement depicted has been found to reduce wear on screening surfaces 13a and 13b in comparison to a similar arrangement where the screening surfaces are staggered but there is no provision of a cavity of a height that extends to higher than the extreme end of the screening surface of the directly above screen deck.

Initial comparative tests were carried out in a shale shaker basket mounting only a lower first screen deck 8a and an upper second screen deck 8b. The prior art (control) arrangement is shown in schematic elevation FIG. 2a where the feed receiving end 10b of deck 8b, in this case extreme end 37b of upper, second, screening surface 13b; is staggered by a horizontal displacement X from the extreme end 37a of the feed receiving end of lower, first, screening surface 13a. Other parts of the screen decks 8a, 8b not shown in this figure, for clarity. Feed 15 all passes screening surface 13b of screen deck 8b, before contacting surface 13a. No cavity extending to higher than the extreme end 37b of the screening surface of the second screen deck 13b was provided.

The screening surfaces 13a, 13b comprised multiple screen panels laid abutting in the usual way. The screen panels were manufactured to commercial specifications for shale shaker use (steel mesh screening material on apertured support plates).

The shale shaker basket 1 was used to process a simulated drilling mud (feed 15). The simulated mud is a solution of water including a polymer, to increase viscosity, together with solids. The solids content is barite as weighting agent (to increase density of the simulated mud); and sand, to provide a relatively harsh, abrasive regime on the screening surfaces.

Figure 2A:
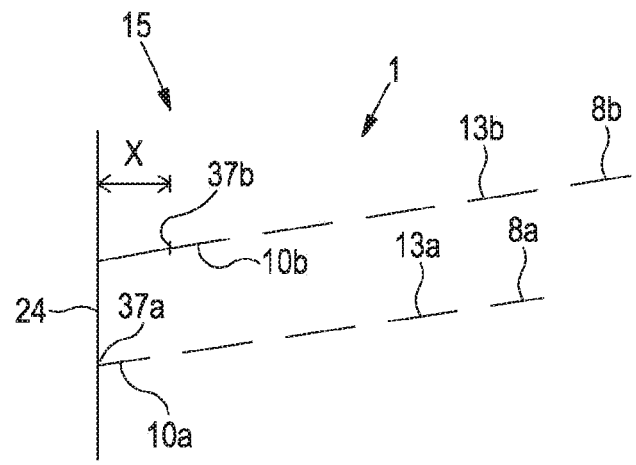
FIG. 2a shows a prior art shale shaker basket in schematic elevation.

The prior art arrangement of FIG. 2a was used to process the simulated drilling mud until damage became evident. On inspection, 30% of the mesh panels comprising the rear (feed end) two rows of panels making up the lower screening surface 13a had failed (were holed). A further 58% of the screen panels of the screening surface 13a showed wear on visual inspection.

Figure 2B:
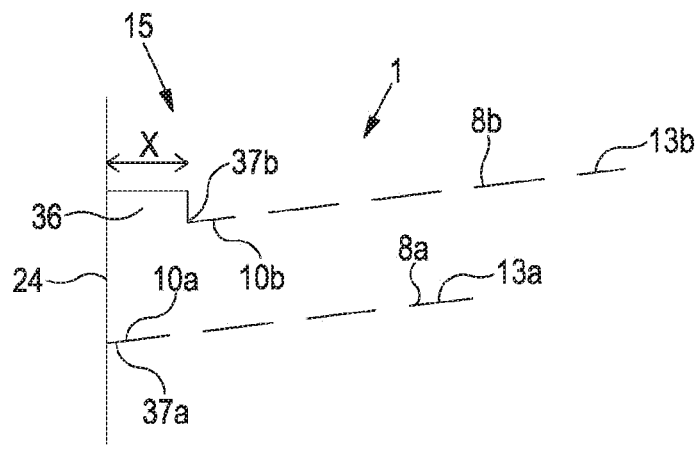
FIG. 2b shows a shale shaker basket in accordance with principles disclosed herein in schematic elevation.

The configuration of the basket was then changed to that shown in FIG. 2b where the horizontal stagger remained the same (X) but a cavity 36 was provided (as depicted in more detail in FIGS. 1, 1a). The screening surfaces 13a, 13b were made of the same specification multiple screen panels as for FIG. 2a.

Using this arrangement according to the disclosure, the basket 1 was used to process the simulated drilling mud for the same period of time and at similar flow rates as the test for the control arrangement of FIG. 2a. On inspection 0% of the mesh panels comprising the rear (feed end) two rows or the screening surface 13a had failed, and only a further 25% were showing wear.

Figure 3A:
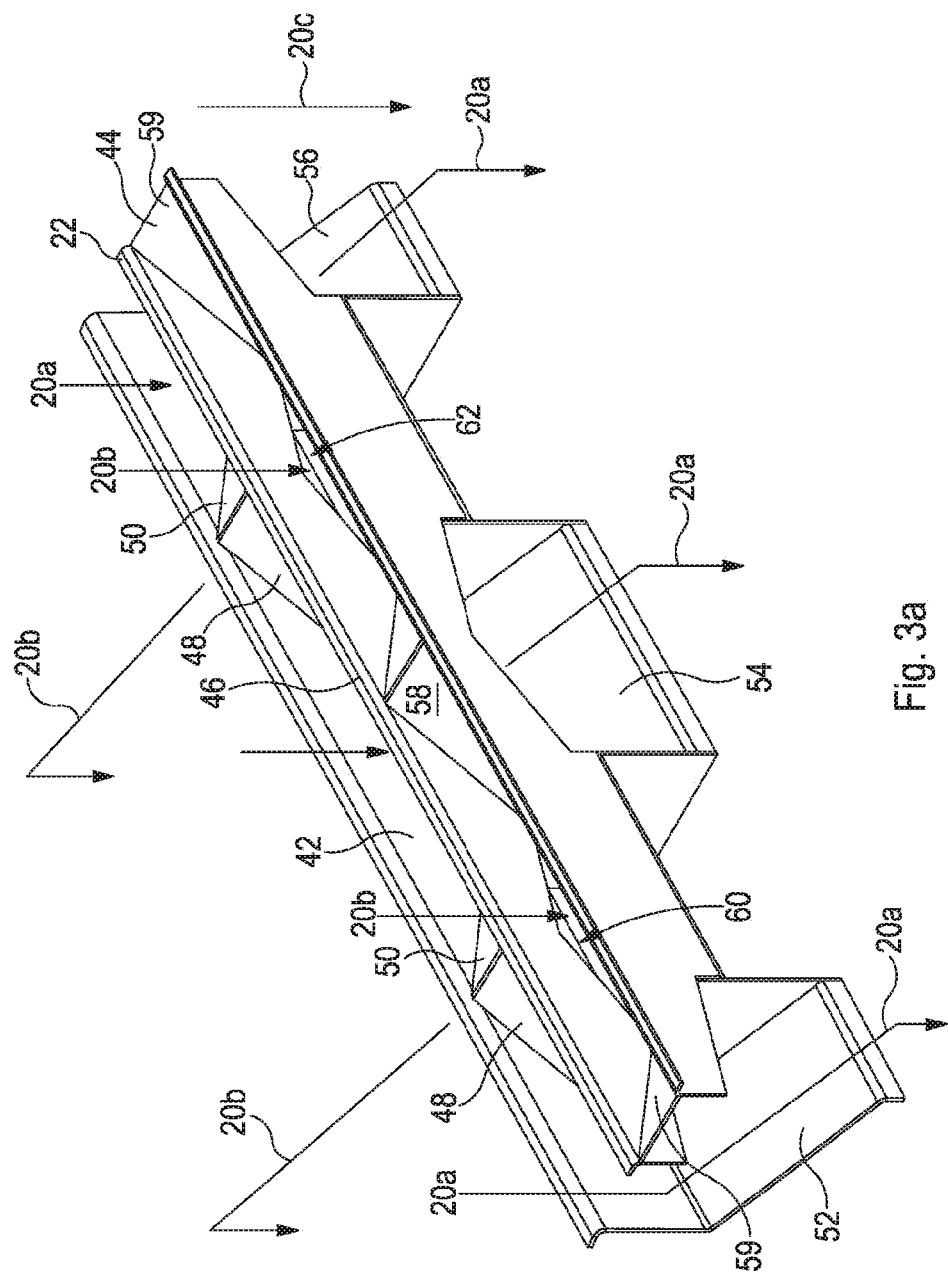
FIGS. 3a and 3b show in schematic perspective a solids collecting and distribution chute.
Figure 3B:
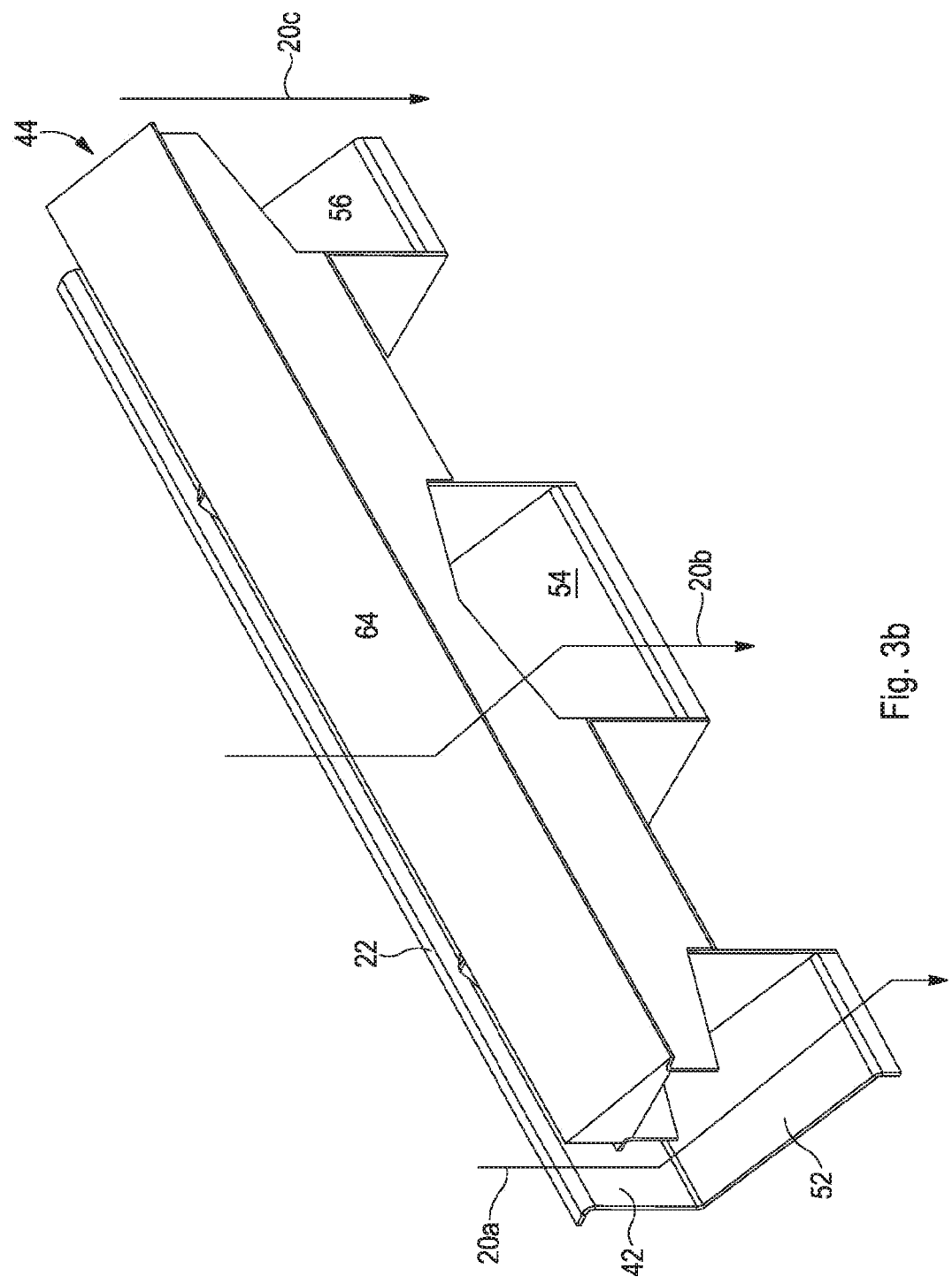

FIG. 3a shows in schematic perspective the solids collecting and distribution chute 22 of FIG. 1. The chute 22 has two troughs 42, 44 extending across the basket of a shale shaker in use and divided by wall 46. In the arrangement of FIG. 1, trough 42 will be below solids discharge end 12a and trough 44 below solids discharge end 12b.

In use solids falling from end of a screening surface 12a and landing into trough 42 are directed via ramps 48, 50 and discharge ports 52, 54 and 56 that include ramps in this example, away from the basket where they will join solids falling from solids discharge end 12c (see arrows 20a and 20c, also in FIG. 1).

Solids falling from end of a screening surface 12b land in trough 44 and are directed by ramps 58, 59 and discharge ports 60, 62 (with ramps) toward the underneath of the basket see arrows 20b, also in FIG. 1. There these solids can join the fluid and solids mixture passing through all three screens as suggested by arrows 18 in FIG. 1. By this means solids collected on the middle screening surface 13b are returned to the fluid stream i.e. to the screened drilling mud. Alternatively where it is desired to return the solids from the middle screening surface 13b to drilling mud further downstream in the mud processing system, then ports 60, 62 may direct solids via a conveying system, such as a conveyor belt (not shown) to a downstream location.

Thus the chute 22 affords a convenient means of recycling solids of a selected size range to the drilling mud. If solids recycling is not required then a baffle piece 64 (FIG. 3b) can be fitted over trough 44 so that all solids collected by the screening surfaces are discharged in the same direction, away from the sump 19 of the shale shaker.

Figure 4A:
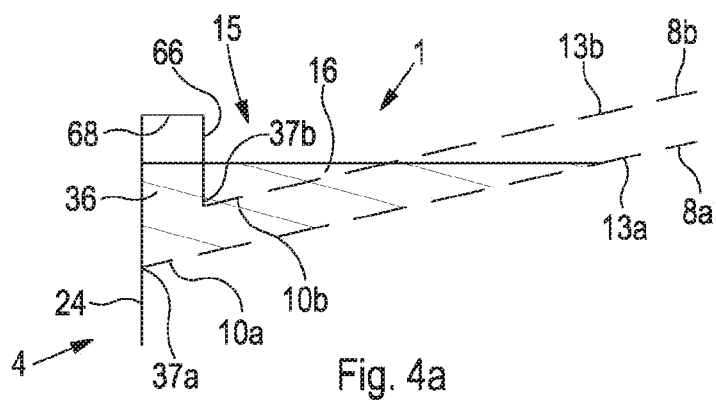
FIGS. 4a, 4b, 4c and 4d show alternative shale shaker baskets of the disclosure, in schematic elevations.

FIG. 4a shows in schematic elevation an arrangement according to the disclosure where two fluid retaining walls are employed. In this example the feed receiving end 10b of deck 8b, in this case extreme end 37b of upper, second, screening surface 13b; is staggered by a horizontal displacement from the extreme end 37a of the feed receiving end of lower, first, screening surface 13a. Other parts of the screen decks 8a, 8b not shown in this figure, for clarity.

The horizontal stagger is provided by the extreme end 37a of the feed receiving end of lower, first, screening surface 13a connecting to fluid retaining wall 24 whilst the extreme end 37b of upper, second, screening surface 13b connects to a second spaced apart fluid retaining wall 66. Cavity 36 is between the fluid retaining wall 24 and the second fluid retaining wall 66. Optional roof 68 is provided in this example.

A common pond 16 forms as shown by the application of feed 15 to the feed receiving end 10b of second screening surface 13b. Cavity 36 only receives feed that has passed though deck 8b. Solids and liquid within cavity 36 may only escape to the screening surfaces 13a, 13b and the space between them. Thus the first screening surface 13a will process all the feed 15 passing through the second screening surface 13b.

Figure 4B:
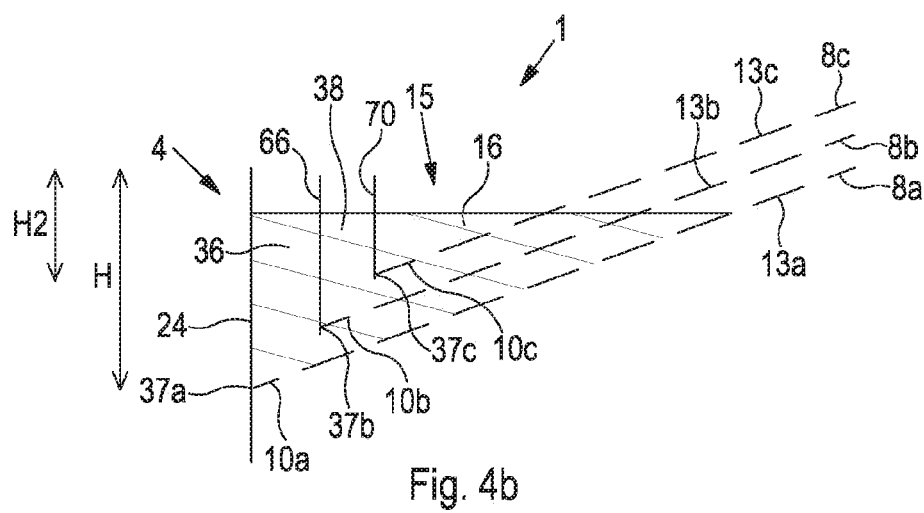

FIG. 4b shows a similar arrangement to that of FIG. 4a except that three screen desks 8a, 8b and 8c are provided the feed receiving ends 10a, 10b, 10c of screen decks 8a, 8b, 8c each connect to a different fluid retaining wall i.e. 24, 66 and 70 respectively. Feed 15 is applied to the feed receiving end 10c of third screen deck 8c.

In this example cavity 36 and second cavity 38 are not provided with roofs. The height of walls 24, 66 and 70 is sufficient to retain pond 16 as it is processed through the screen decks. The vertical heights of the first and second cavities 36, 38 are indicated as H and H2, extending from the respective screening surface to the highest fluid retaining point of a fluid retaining wall 24, 66, 70, that retains fluid within the cavity.

Figure 4C:
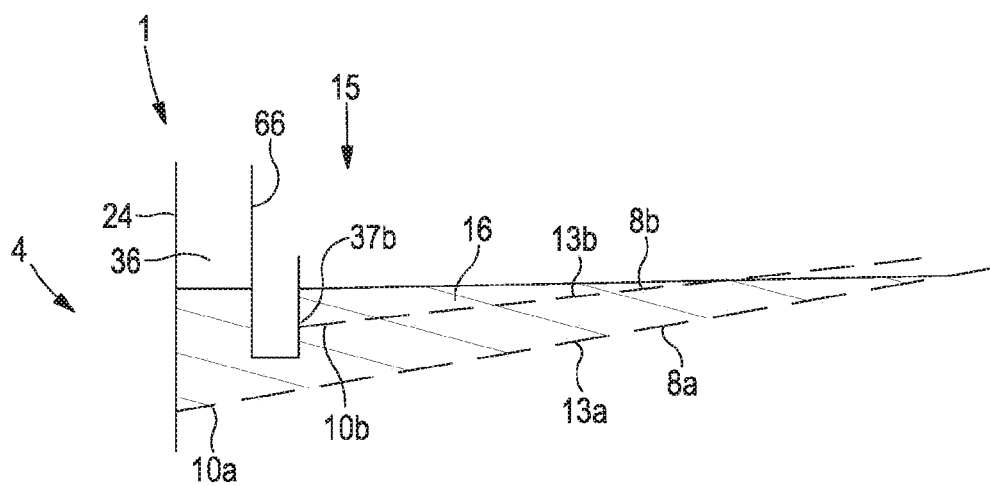

In FIG. 4c a similar arrangement to that of FIG. 4a is depicted except that the extreme end 37b of the second, screening surface 13b connects to an upwards directed flange of the second fluid retaining wall 66. Furthermore a roof is not provided on cavity 36. Also shown in this figure are converging screen decks 8a and 8b that become more closely spaced as they move away from the rear end 4 of basket 1 towards the front end (not shown).

Figure 4D:
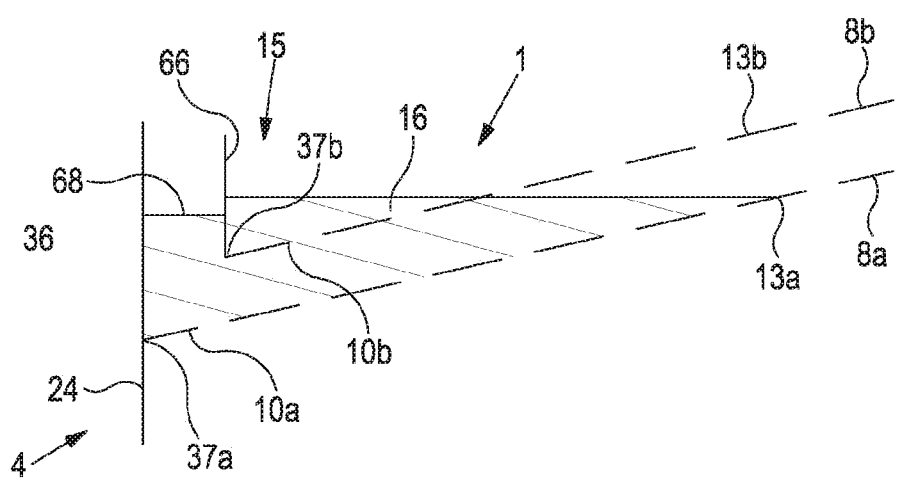

In FIG. 4d and arrangement similar to that of FIG. 4a is depicted, except that roof 68 in cavity 36 is lower. In use, the roof 68 restricts the possible height of the pond region 16 within cavity 36; in comparison to the possible height above second screen 8b.

The invention claimed is:

1. A shale shaker comprising:
a basket having a solids discharge end and a feed end spaced apart by opposed first and second sides, and a fluid retaining wall positioned at the feed end;
said basket including a stack of screen decks, each screen deck having a screening surface, with the screening surface of the screen decks spaced apart and superposed one above the other;
wherein the stack of screen decks comprises at least a first screen deck and a second screen deck, wherein the second screen deck is directly above the first screen deck;
wherein the each of the first and second screen decks have a first end and a second end, wherein the first end is proximal to the fluid retaining wall, and the second end is distal to and higher than the first end;
wherein the screening surfaces of the first and second screen decks are spaced apart, by a vertical spacing of from 20 mm to 250 mm, at the first end of the second screen deck;
wherein the first end of the second screen deck is further from the feed end of the basket than the first end of the first-screen deck;
wherein there is a cavity above the first end of the first screen deck, in direct fluid communication with a space between the screening surfaces of the first and second screen decks, and is configured to only receive feed that has passed through the second screen deck;
wherein the cavity extends to higher than the screening surface of the second screen deck, at the first end of the second screen deck; and
wherein there is no outlet for solids and liquid from the cavity other than to the screening surfaces of the first and second screen decks and the space between them, and
wherein the cavity is directly above the screening surface of the first screen deck, at the first end of the first screen deck and extends at least across the full width of the screening surface of the first screen deck at the first end of the first screen deck.

2. The shale shaker of claim 1 wherein the vertical spacing between screening surfaces of the first and second screen decks is from 20 mm to 120 mm.

3. The shale shaker of claim 1 wherein the cavity is of a vertical height of from 115% to 1000% of the vertical spacing between the screening surfaces of the first and second screen deck, measured at the extreme end of the screening surface of the second screen deck, at the first end.

4. The shale shaker of claim 3 wherein the cavity is of a vertical height of from 115% to 500% of the vertical spacing between the screening surfaces of the first and second screen deck, measured at the extreme end of the screening surface of the second screen deck, at the first end.

5. The shale shaker of claim 1 wherein the cavity is defined by the first end of the first screen deck, the fluid retaining wall and a roof.

6. The shale shaker of claim 1 wherein the first end of the second screen deck is further from the feed end of the basket than the first end of the first screen deck by a horizontal displacement of from 25 mm to 500 mm.

7. The shale shaker of claim 1 wherein the vertical spacing between the screening surfaces of the first and second screen decks is constant, from the feed end of the basket towards the solids discharge end of the basket.

8. The shale shaker of claim 1 wherein the vertical spacing between the screening surfaces of the first and second screen decks converges, from the feed end of the basket towards the solids discharge end of the basket.

9. The shale shaker of claim 1 wherein the vertical spacing between the screening surfaces of the first and second screen decks diverges, from the feed end of the basket towards the solids discharge end of the basket.

10. The shale shaker of claim 1 wherein the length of each of the first and second screen decks, from the feed end of the basket to the solids discharge end of the basket is the same.

11. The shale shaker of claim 1 wherein the stack of screen decks comprises a third screen deck that is directly above the second screen deck;

wherein the third screen deck has a first end and a second end, wherein the first end is proximal to the fluid retaining wall and the second end of the third screen deck is distal to and higher than the first end of the third screen deck;

wherein the screening surfaces of the second and third screen decks are spaced apart, by a vertical spacing of from 20 mm to 250 mm, at the first end of the third screen deck;

wherein the first end of the third screen deck is further from the feed end of the basket than the first end of the second screen deck; and wherein there is a second cavity, above the first end of the second screen deck in direct fluid communication with a space between the screening surfaces of the second and third screen decks, and is configured to only receive feed that has passed through the third screen deck; wherein the second cavity extends higher than the screening surface of the third screen deck at the first end of the third screen deck.

12. The shale shaker of claim 11 wherein the vertical spacing between the screening surfaces of the first and second screen decks at the first end of the second screen deck and between the screening surfaces of the second and third screen decks at the first end of the third screen deck is the same.

13. The shale shaker of claim 11 wherein the vertical spacing between the screening surfaces of the second and third screen decks is constant, from the feed end of the basket towards the solids discharge end of the basket.

14. The shale shaker of claim 11 wherein the length of each of the second and third screen decks, from the feed end of the basket to the solids discharge end of the basket is the same.

15. The shale shaker of claim 11 wherein the second end of each of the first, second and third screen decks, are vertically aligned.

16. The shale shaker of claim 11 wherein the second cavity extends above the first end of the second screen deck to the same height that the cavity extends above the first end of the first screen deck.

17. The shale shaker of claim 11 wherein the second cavity is of a height of from 115% to 1000% of the vertical spacing between the screening surfaces of the second and third screen decks measured at the first end of the third screen deck.

18. The shale shaker of claim 11 wherein the second cavity is defined by the first end of the second screen deck, the fluid retaining wall and a roof.

19. The shale shaker of claim 11 wherein the first end of the third screen deck is further from the feed end of the basket than the first end of the second screen deck by a horizontal displacement of from 25 mm to 500 mm.

20. The shale shaker of claim 11 wherein the first end of the first screen deck is connected to the fluid retaining wall and the first end of the second screen deck is connected to a downwards directed flange of the fluid retaining wall projecting towards the solids discharge end of the basket.

* * * * *